(12) United States Patent
Nishi et al.

(10) Patent No.: US 11,645,124 B2
(45) Date of Patent: May 9, 2023

(54) PROGRAM EXECUTION CONTROL METHOD AND VEHICLE CONTROL DEVICE

(71) Applicant: Hitachi Automotive Systems, Ltd., Hitachinaka (JP)

(72) Inventors: Masataka Nishi, Tokyo (JP); Tomohito Ebina, Ibaraki (JP); Kazuyoshi Serizawa, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 333 days.

(21) Appl. No.: 16/969,702

(22) PCT Filed: Jan. 23, 2019

(86) PCT No.: PCT/JP2019/001978
§ 371 (c)(1),
(2) Date: Aug. 13, 2020

(87) PCT Pub. No.: WO2019/159616
PCT Pub. Date: Aug. 22, 2019

(65) Prior Publication Data
US 2021/0004278 A1 Jan. 7, 2021

(30) Foreign Application Priority Data
Feb. 16, 2018 (JP) .............................. JP2018-025692

(51) Int. Cl.
*G06F 9/52* (2006.01)
*G06F 9/54* (2006.01)

(52) U.S. Cl.
CPC .............. *G06F 9/524* (2013.01); *G06F 9/544* (2013.01); *G06F 9/546* (2013.01)

(58) Field of Classification Search
CPC .......... G06F 9/524; G06F 9/544; G06F 9/546
See application file for complete search history.

(56) References Cited

U.S. PATENT DOCUMENTS

| 2006/0123420 A1 | 6/2006 | Nishikawa |
| 2007/0074207 A1 | 3/2007 | Bates |

(Continued)

FOREIGN PATENT DOCUMENTS

| JP | 2006-155480 A | 6/2006 |
| JP | 2009-510613 A | 3/2009 |

(Continued)

OTHER PUBLICATIONS

International Search Report with English translation and Written Opinion issued in corresponding application No. PCT/JP2019/001978 dated May 21, 2019.

*Primary Examiner* — Emerson C Puente
*Assistant Examiner* — Jonathan R Labud
(74) *Attorney, Agent, or Firm* — Foley & Lardner LLP

(57) ABSTRACT

To be capable of concurrent execution of a function group not in data conflict by a plurality of cores and to execute a function pair in data conflict in a temporal separation manner. A process barrier 20 includes N−1 checker functions 22 and one limiter function 23, where the number of cores capable of concurrently executing the functions is N (N is an integer equal to or greater than 2), the checker functions 22 determine whether the head entry of a lock-free function queue LFQ1 is either the checker function 22 or the limiter function 23, and repeats reading of the head entry of the lock-free function queue LFQ1 if either, and ends processing if neither, and the limiter function 23 is an empty function ending without performing any processing.

8 Claims, 9 Drawing Sheets

(56) References Cited

U.S. PATENT DOCUMENTS

| | | | |
|---|---|---|---|
| 2012/0159495 A1* | 6/2012 | Rajagopalan | G06F 9/5066 |
| | | | 718/102 |
| 2013/0014114 A1 | 1/2013 | Nagata | |
| 2014/0282574 A1* | 9/2014 | Marathe | G06F 9/4881 |
| | | | 718/103 |

FOREIGN PATENT DOCUMENTS

| | | |
|---|---|---|
| JP | 2011-248469 A | 12/2011 |
| JP | 2014-063278 A | 4/2014 |
| JP | 2017-073000 A | 4/2017 |

\* cited by examiner

PROGRAM EXECUTION CONTROL METHOD AND VEHICLE CONTROL DEVICE

TECHNICAL FIELD

The present invention relates to a program execution control method and a vehicle control device that are capable of multi-core or many-core program parallel execution.

BACKGROUND ART

As semiconductor miniaturization technology has come to a dead end, performance that had been improved by speeding up the clock cycle has come to be improved by mounting a multitude of cores on one micro processing unit (MPU), and many-core MPUs suitable for various applications such as servers and portable terminals have been sold. These applications are designed on the assumption that the operating system (OS) controls concurrent execution of a plurality of applications that are designed on the assumption of a single-core MPU and satisfy the data separation condition, thereby getting the performance of many-core. In this concurrent execution control, although read/write access to a shared resource in the OS occurs, temporal separation is achieved by forcibly sequentially executing functions using an existing exclusive control mechanism, and a degree of success is achieved in avoiding data integrity failures caused by data conflict.

However, in control software that has been designed, inherited, and derived on the assumption of a single-core for many years, access conflict related to shared resources represented by global variables is remarkable. Therefore, it is impossible to perform program concurrent execution on the assumption of the data separation as described above, and there is no OS support. Since program concurrent execution allowing data conflict derives a non-deterministic post-execution program state, debug, test, and verification become impossible.

In reality, in order to distribute the interrupt processing load, a calculation load difficult to assume at the time of design occurs in a plurality of cores. Therefore, even in a design method for optimization by explicitly allocating functions using the core occupancy time for each function, it is difficult to guarantee the worst-case response time as long as the upper limit of uncontrollable dead time due to time synchronization is indefinite.

In the conventional technique, there are various methods for explicitly controlling the execution order of tasks statically allocated to each core in consideration of constraint of the inter-task dependency relation, but there are two common problems. The first problem is that the use of a shared resource that does not scale in proportion to the number N of cores (N is an integer equal to or greater than 2) is assumed. The second problem is that due to disturbance loads such as interrupt processing, it is not possible to suppress the dead time realized by performing static task allocation that has been optimized and determined at the time of design, and it is not possible to guarantee the worst response time.

PTL 1 discloses a parallelization method for analyzing control dependency among a plurality of series of processing constituting a sequential execution program, classifying the processing into a dependent task and a non-dependent task, and allocating the series of processing to different cores. This is an example of the temporal separation based on the execution order relation and the parallelization method based on the data separation condition, and it is possible to suppress the dead time generated by executing none of tasks due to synchronization waiting between cores.

The technique disclosed in PTL 1 realizes a function of an MPU that releases a waiting state via an inter-core communication means when controlling the execution order of tasks. However, when allocating the same number of tasks as the number N of cores utilizing a multitude of cores, if the dependency relation between the tasks becomes complicated, the performance does not scale to N times even if the number N of cores is increased. In terms of hardware, $N*(N-1)/2$ inter-core communication paths are required for the number N of cores. However, the inter-core communication path only scales to O(N) (order of N).

Most many-core MPUs are divided into roles of a master core and a multitude of slave cores, and the master core explicitly designates an execution task to the slave cores, thereby assuming a task allocation and concurrent execution control method that addresses the scalability problem of inter-core communication paths. In reality, not only many-cores with N being about 6 but also graphics processing units (GPU) with N being over 1000 have only communication paths available for one-to-all inter-core communication, the number of which is less than O(N).

In order to satisfy this constraint in accordance with the scope of PTL 1, there is no choice but to increase the number of processes constituting each task by aggregating processing groups having close dependency relations. In this case, a parallelly executable task pair has to be aggregated into one core and sequentially executed, and it is not possible to efficiently utilize a multitude of cores.

Furthermore, each core does not merely execute a time-scheduled task, but is also used to distribute interrupt processing to a multitude of cores, for the purpose of suppressing the response time for interrupt processing from an external device and leveling the load. If such interrupt processing occurs during task execution, it is not realized the effect of shortening the synchronization waiting dead time achieved by task allocation designed to level the load of a multitude of cores.

PTL 2 points out, as a technical background, the importance of causing a multitude of cores to parallelly operate by utilizing intra-program and inter-program parallelism using data separation conditions. It also mentions a method of achieving synchronization processing between cores through a barrier synchronization mechanism implemented in a parallel computing environment such as MPI, OpenMP, and pthread.

It also mentions that in a case of implementation only by software without using dedicated hardware such as that installed in HPC, frequent use of barrier synchronization degrades the execution performance of the software, and that variations in assumptions about the barrier processing completion time cause dead time not intended at the time of design.

In barrier synchronization, an implementation of holding a counter of the number of end processes in a shared memory region, for example, is common. Since a multitude of cores perform read/write access to this counter, an exclusive control mechanism is required. Since dead time due to exclusive control of the counter operation required for barrier synchronization processing occurs, the performance does not scale to N times with respect to the number N of cores. In order to realize scalability with respect to the number N of cores, access to shared data related to barrier synchronization control needs to be at least lock-free, but there is no mention in this regard. Furthermore, an inter-core communication path for notifying operation resumption when the counter value reaches a prescribed value is still required.

If coping with the processing time and hardware resources required for this barrier synchronization being not scaled with respect to the number N of cores, there is no choice but to increase the number of processes constituting the task, and it is not possible to efficiently utilize a multitude of cores, similarly to the technique disclosed in PTL 1. At this time, when coping with the problem by reducing the processing unit in order to efficiently utilize a multitude of cores, execution performance deterioration is caused.

Instead, PTL 2 discloses an inter-core communication means for suppressing the latency of barrier synchronization processing execution by using dedicated hardware in which a tree structure is introduced into an inter-core notification path. This is a method of hierarchizing core groups into a tree structure and limiting the communication paths to those between adjacent cores, instead of all-to-all inter-core communication paths. As disclosed in PTL 2, this method can be implemented with dedicated hardware or can be implemented with software only.

Furthermore, the actual number of communication paths required for all-to-all inter-core communication is suppressed to about O(N), and the barrier synchronization processing time is limited to about the number of communication steps that only increases in $\log_2 N$. However, efficient software implementation is possible only when O(N) inter-core communication means are mounted.

PTL 3 discloses a method of controlling the selection and allocation order of threads executed by each core, in which the priority of each task is set, registered in a priority queue, and the thread selection and allocation order is controlled in the dequeue order.

In order to guarantee predictability and reproducibility of program concurrent execution in accordance with the scope of PTL 3, a method is conceivable in which, for example, the same priority is allocated to threads executing a task group in which data separation conditions are satisfied and parallel execution is possible, and different priority levels are set to a task group that requires temporal separation and explicit control of execution order and the priority is allocated so as to become smaller in the order of execution from task start to end. This method realizes dynamic thread allocation in consideration of at least the core operation rate.

However, PTL 3 only discloses a technique for leveling the calculation load of each core, and does not disclose a concurrent execution control mechanism for temporal separation of the execution time point of a thread pair in data conflict. Furthermore, O(N) inter-core communication paths are still required between the master core, which selects and controls the thread executed by each core from the priority queue, and a multitude of other slave cores.

CITATION LIST

Patent Literature

PTL 1: JP 2017-73000 A
PTL 2: JP 2014-63278 A
PTL 3: JP 2006-155480 A

SUMMARY OF INVENTION

Technical Problem

The designs, debugging, test techniques, coverage criteria, and verification methods used in conventional software development methods all depend on an assumption that a multitude of functions are executed sequentially and reproducibility and predictability of the post-execution program state are satisfied.

The reproducibility and predictability are also necessary requirements for guaranteeing the worst-case response time required for the control software. Therefore, a concurrent execution control mechanism is required in which a function group for which data separation conditions are satisfied are executed concurrently by a plurality of cores, and a function pair for which temporal separation is required due to data conflict are executed sequentially, regardless of a specific means of implementing program concurrent execution.

In particular, there has been a demand for a parallel execution control mechanism that is independent of an inter-core communication mechanism that does not scale with respect to an increase in the number of cores, adapts to an interrupt load difficult to assume at the time of design, dynamically levels the calculation waiting time of each core, and can guarantee the worst execution time.

The present invention has been made in view of the above circumstances, and its object is to provide a program execution control method and a vehicle control device that are capable of concurrent execution of a function group not in data conflict by a plurality of cores and capable of execution of a function pair in data conflict in a temporal separation manner.

Solution to Problem

In order to achieve the above object, a program execution control method according to a first aspect holds a lock-free function queue in which a plurality of concurrently executable functions are registered in sequence, wherein the lock-free function queue includes a process barrier inserted between functions in data conflict, and, of prior and subsequent functions in data conflict, the process barrier causes execution of the subsequent function to wait at a position of the process barrier until execution of the prior function is completed.

Advantageous Effects of Invention

According to the present invention, it is possible to concurrently execute a function group not in data conflict by a plurality of cores and possible to execute a function pair in data conflict in a temporal separation manner.

DESCRIPTION OF EMBODIMENTS

Embodiments will be described with reference to the drawings. The embodiments described below do not limit the invention according to claims, and not all of the elements and combinations thereof described in the embodiments are essential to the solution of the invention.

Figure 1:
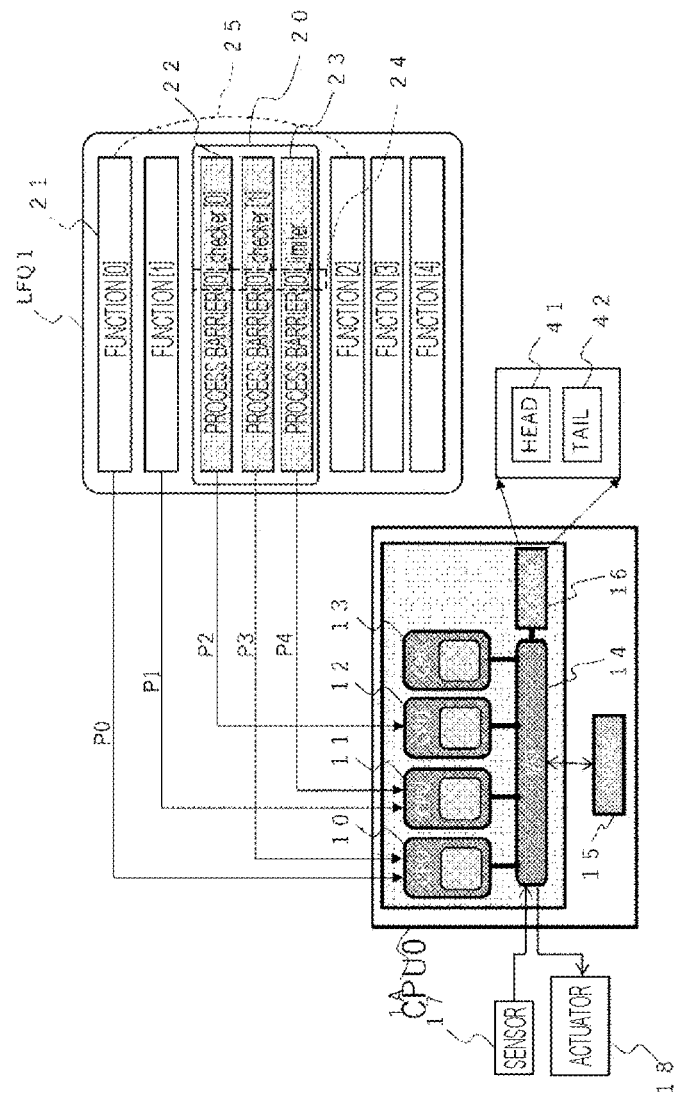
FIG. 1 is a block diagram illustrating a configuration of a vehicle control device to which a program execution control device according to a first embodiment is applied.

FIG. 1 is a block diagram illustrating the configuration of the vehicle control device to which the program execution control device according to the first embodiment is applied.

In FIG. 1, a computer 1A is provided with a plurality of cores 10 to 13, an input/output interface 14, a DRAM 15, and a cache 16. The computer 1A is connected to a sensor 17 and an actuator 18 via the input/output interface 14. The core may be provided for each CPU, or a plurality of cores may be provided for one CPU. The DRAM 15 can be used as a shared memory accessible from the cores 10 to 13.

At this time, each of the cores 10 to 13 can access the DRAM 15 and the cache 16 via the input/output interface 14. The sensor 17 monitors the state of each part of a vehicle. The actuator 18 drives a power train system, a steering system, a braking system, and the like of the vehicle.

The DRAM 15 holds a lock-free function queue LFQ1. The DRAM 15 can hold an execution code executed by each of the cores 10 to 13. In the lock-free function queue LFQ1, a plurality of functions that can be executed concurrently by the computer 1A are registered in sequence. The lock-free function queue LFQ1 can be constructed in advance by a programmer and stored in a ROM or the like. A plurality of lock-free function queues LFQ1 can be prepared, and any of the cores 10 to 13 can be sequentially loaded into the DRAM 15 in a cycle of 10 msec, for example. For convenience of implementation, instead of a function entity, a pointer to the function entity may be registered in the lock-free function queue LFQ1. FIG. 1 illustrates an example in which functions [0] to [4] are registered. In the lock-free function queue LFQ1, a process barrier 20 is inserted between functions in data conflict. Data conflict includes change of the value of a global variable depending on the order of reading or writing of the global variable. Data conflict is caused where there is a dependency relation between data.

The process barrier 20 is arranged immediately before the subsequent function in data conflict of the prior and subsequent functions in data conflict. For example, assuming that the functions [0] and [2] cause data conflict 25, the process barrier 20 is inserted immediately before the function [2].

The process barrier 20 causes execution of the subsequent function to wait at a position of the process barrier 20 until execution of the prior function of the prior and subsequent functions in data conflict is completed. At this time, functions not separated by the process barrier 20 can be processed concurrently by the plurality of cores 10 to 13. For example, the functions [0] and [1] can be processed concurrently by the cores 10 to 13. The functions [2] to [4] can also be processed concurrently by the cores 10 to 13.

Furthermore, for the functions separated by the process barrier 20, the process barrier 20 causes execution of the function subsequent to the process barrier 20 to wait at a position of the process barrier 20 until the function prior to the process barrier 20 in data conflict with the function subsequent to the process barrier 20 is executed. Then, the process barrier 20 allows allocation of the cores 10 to 13 which are to execute the subsequent function upon completion of execution of the prior function of the prior and subsequent functions in data conflict. At this time, when the function prior to the process barrier 20 in conflict with the function subsequent to the process barrier 20 is executed, the plurality of cores 10 to 13 can concurrently execute the function for the function subsequent to the process barrier 20.

The process barrier 20 includes N−1 checker functions 22 and one limiter function 23, where the number of cores capable of concurrently executing functions is N (N is an integer equal to or greater than 2). The limiter function 23 is arranged immediately after the checker function 22. For example, assuming that the cores 10 to 12 are cores capable of concurrent execution, the process barrier 20 is provided with the two checker functions 22 and the one limiter function 23. FIG. 1 presents an example in which a process barrier [0]_checker [0] and a process barrier [0]_checker [1] are inserted as the checker functions 22, and a process barrier [0]_limiter is inserted as the limiter function 23.

It is possible to insert a plurality of the process barriers 20 into the lock-free function queue LFQ1 in accordance with data conflict between functions. In order to distinguish these process barriers 20, a process barrier ID 24 is attached to the process barrier 20. At this time, the checker function 22 and the limiter function 23 belonging to the same process barrier 20 hold the same process barrier ID 24.

The checker function 22 determines whether the head entry of the lock-free function queue LFQ1 is either the checker function 22 or the limiter function 23, and repeats reading of the head entry of the lock-free function queue LFQ1 if either, and ends the processing if neither. The limiter function 23 is an empty function ending without performing any processing.

When acquiring the entry registered in the lock-free function queue LFQ1, the position of the head or last registration entry can be known by referring to variables of a HEAD 41 and a TAIL 42. The HEAD 41 and the TAIL 42 can be held in the cache 16 for speeding up the access. The DRAM 15 may hold the HEAD 41 and the TAIL 42. Then, the HEAD 41 may be held in the cache 16 in accordance with the number of times of access to the HEAD 41.

In order to avoid data conflict without using an exclusive control mechanism such as a mutex and in order for the plurality of cores 10 to 13 to update the HEAD value and the TAIL value, it is possible to make the lock-free function queue LFQ1 lock-free by using a compare-and-swap (CAS) instruction that can atomically rewrite the HEAD value and the TAIL value. The cores 10 to 13 having succeeded in execution of the CAS instruction acquire the head entry of the lock-free function queue LFQ1 and advance the HEAD value to the next registration entry. The cores 10 to 13 having failed to execute the CAS instruction due to write access conflict for the HEAD value acquire the registration entry by executing the CAS instruction again for the updated HEAD value. At this time, even when the plurality of cores 10 to 13 simultaneously access the HEAD value, one core always succeeds in execution of the CAS instruction, and it does not happen that all the cores having simultaneously accessed to the HEAD value fail to execute the CAS instruction. For this reason, as long as the number N of cores is finite, it is possible to prevent failure of execution of the CAS instruction from being repeated endlessly, and it is possible to reduce the dead time at the time of the entry acquisition.

With the introduction of the process barrier 20, up to the time point at which any one core $X_1$ concurrently operating dequeues the limiter function 23, the other cores $X_2$ to $X_N$ continue to execute the checker function 22. On the other hand, when the core $X_1$, which has dequeued the limiter function 23, has finished executing an empty function and dequeued a function immediately after the process barrier 20, the other cores $X_2$ to $X_N$ end the checker function 22 and dequeue and execute the subsequent function registered in the lock-free function queue LFQ1.

Due to this, in the lock-free function queue LFQ1 in which the process barrier 20 is inserted, the cores $X_1$ to $X_N$ can concurrently execute a function group not separated by the process barrier 20, and temporally separate the prior and subsequent function pair separated by the process barrier 20.

In this process, a mechanism such as an explicit time synchronization between cores $X_1$ and $X_N$ is not required, and it is only required to determine whether the head entry of the lock-free function queue LFQ1 is either the checker function 22 or the limiter function 23, thereby requiring only a length of time equivalent to read access to the data of the head entry of the lock-free function queue LFQ1 stored in the shared memory. Accordingly, the synchronization waiting dead time is minimized, and the maximum parallelization performance can be obtained within the parallelizable range inherent in the lock-free function queue LFQ1.

Each of the cores $X_1$ to $X_N$ has a calculation load difficult to assume caused by interrupt processing occurring on an irregular basis. Therefore, even if a core statically executing parallelization processing is allocated at the time of design, a synchronization waiting dead time different from that assumed at the time of design remains, and hence it is impossible to obtain the desired parallelization performance. With the introduction of the process barrier 20, each of the cores $X_1$ to $X_N$ operates so as to process the functions registered in the lock-free function queue LFQ1 with its own occupancy time as the maximum, and hence the synchronization waiting dead time can be limited to the period in which the checker function 22 is being executed.

Furthermore, the function processed by each of the cores $X_1$ to $X_N$ concurrently operates so that the data separation condition and the temporal separation condition are satisfied while being dynamically selected, and hence the same post-execution program state as in the case where the functions registered in the lock-free function queue LFQ1 are sequentially executed can be derived.

Figure 2:
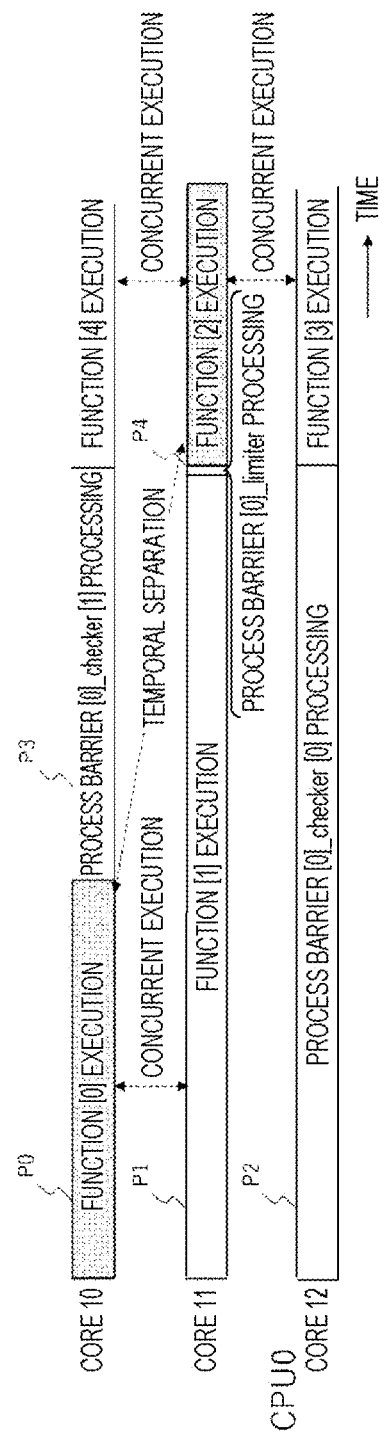
FIG. 2 is a timing chart illustrating an operation state of the program execution control device of FIG. 1.

FIG. 2 is a timing chart illustrating the operation state of the program execution control device of FIG. 1.

FIG. 2 assumes that the cores capable of concurrent execution are the cores 10 to 12 of FIG. 1. The HEAD 41 is assumed to indicate the function [0] as the head entry of the lock-free function queue LFQ1. Then, assuming that the cores 10 to 12 execute the CAS instruction and the core 10 succeeds in execution of the CAS instruction, the core 10 acquires the function [0] indicated by the HEAD 41, executes the function [0], and advances the HEAD 41 to the next registration entry (P0). At this time, the HEAD 41 indicates the function [1] as the head entry of the lock-free function queue LFQ1.

Next, assuming that the cores 11 and 12 having failed to execute the CAS instruction last time execute the CAS instruction again and the core 11 has succeeded in execution of the CAS instruction, the core 11 acquires the function [1] indicated by the HEAD 41, executes the function [1], and advances the HEAD 41 to the next registration entry (P1). At this time, the HEAD 41 indicates the process barrier [0]_checker [0] as the head entry of the lock-free function queue LFQ1. The function [0] and the function [1] are executed concurrently by the cores 10 and 11.

Next, assuming that the core 12 having failed to execute the CAS instruction last time executes the CAS instruction again and the core 12 has succeeded in execution of the CAS instruction, the core 12 acquires the process barrier [0]_checker [0] indicated by the HEAD 41, executes the processing of the process barrier [0]_checker [0], and advances the HEAD 41 to the next registration entry (P2). At this time, the HEAD 41 indicates the process barrier [0]_checker [1] as the head entry of the lock-free function queue LFQ1.

Next, assuming that the execution of the function [0] has been completed, the core 10 executes the CAS instruction. When the execution of the CAS instruction is succeeded, the core 10 acquires the process barrier [0]_checker [1] indicated by the HEAD 41, executes the processing of the process barrier [0]_checker [1], and advances the HEAD 41 to the next registration entry (P3). At this time, the HEAD 41 indicates the process barrier [0]_limiter as the head entry of the lock-free function queue LFQ1.

Next, assuming that the execution of the function [1] has been completed, the core 11 executes the CAS instruction. When the execution of the CAS instruction is succeeded, the core 11 acquires the process barrier [0]_limiter indicated by the HEAD 41, dequeues the process barrier [0]_limiter, and advances the HEAD 41 to the next registration entry (P4). At this time, the HEAD 41 indicates the function [2] as the head entry of the lock-free function queue LFQ1. The core 11 dequeues the process barrier [0]_limiter, thereby being capable of passing through the process barrier 20.

The core 12 executing the processing of the process barrier [0]_checker [0] monitors the head entry of the lock-free function queue LFQ1, and, if the head entry is the checker function 22 or the limiter function 23, continues monitoring of the head entry of the lock-free function queue LFQ1. If the head entry is neither the checker function 22 nor the limiter function 23, the processing of the process barrier [0]_checker [0] ends. When the HEAD 41 indicates the function [2] as the head entry of the lock-free function queue LFQ1, the head entry becomes neither the checker function 22 nor the limiter function 23, and hence the core 12 ends the processing of the process barrier [0]_checker [0].

At this time, the core 12 can pass through the process barrier 20 because the process barrier [0]_limiter has been dequeued by the core 11.

The core 10 executing the processing of the process barrier [0]_checker [1] also monitors the head entry of the lock-free function queue LFQ1. Then, when the HEAD 41 indicates the function [2] as the head entry of the lock-free function queue LFQ1, the core 10 ends the processing of the process barrier [0]_checker [1]. At this time, the core 10 can also pass through the process barrier 20 because the process barrier [0]_limiter has been dequeued by the core 11.

Upon passing through the process barrier 20, the cores 10 to 12 execute the CAS instruction. Then, the cores 10 to 12 acquire the functions [2] to [4] in accordance with the order in which the CAS instruction has succeeded, and concurrently execute the functions [2] to [4].

Due to this, it becomes possible to temporally separate the function [0] and the function [2] in data conflict, and it becomes possible to concurrently execute the function [0] and the function [1] not in data conflict and to concurrently execute the function [2], the function [3], and the function [4] not in data conflict. With the implementation of the process barrier 20, upon completion of the execution of all the functions prior to the process barrier 20, it is possible to start the parallel execution of the functions subsequent to the process barrier 20 with almost no waiting time, thereby allowing the synchronization waiting dead time to be reduced.

Furthermore, the function [0] and the function [2] in data conflict are temporally separated from each other, and hence the same post-execution program state as in the case where the functions registered in the lock-free function queue LFQ1 are sequentially executed can be derived. For this reason, even when allowing the parallel execution of the functions registered in the lock-free function queue LFQ1, it is possible to prevent debug, test, and verification from becoming impossible.

In addition, even when the functions registered in the lock-free function queue LFQ1 are concurrently executed, the same post-execution program state as in the case where the functions registered in the lock-free function queue LFQ1 are sequentially executed can be derived, and it is hence possible to secure the reproducibility and predictability of the post-execution program state. Therefore, it is possible to guarantee the worst-case response time required for the control software, and it is possible to realize hard real-time control required for the vehicle control device.

Figure 3:
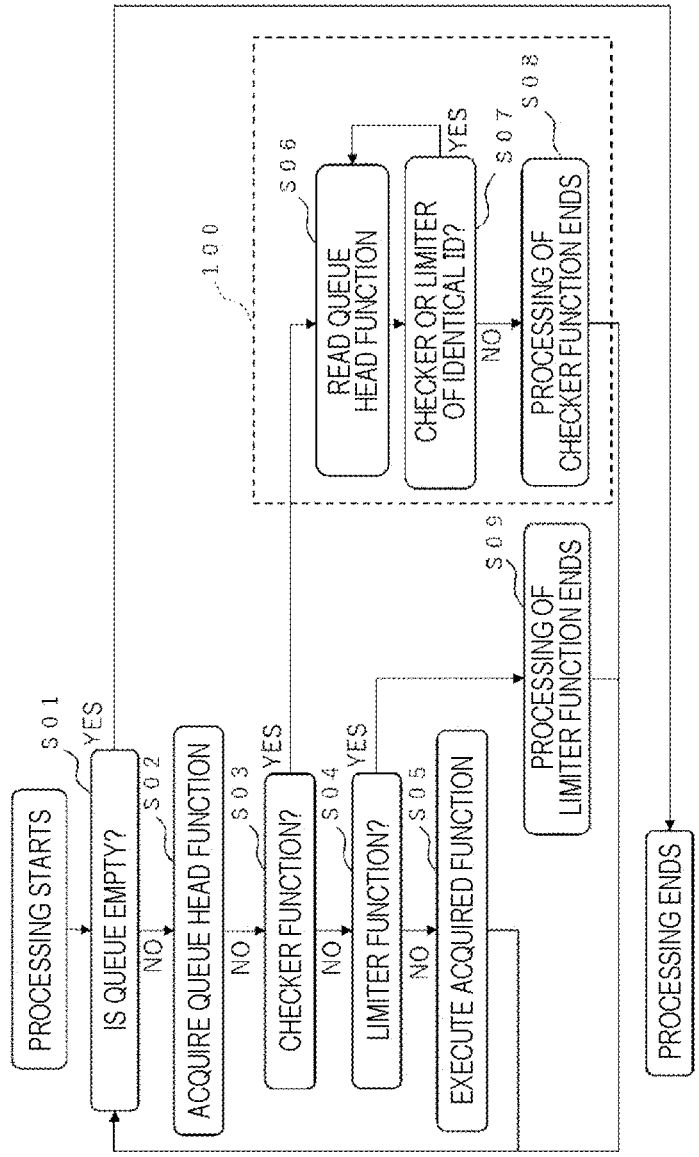
FIG. 3 is a flowchart illustrating a function execution method of the program execution control device of FIG. 1.

FIG. 3 is a flowchart illustrating the function execution method of the program execution control device of FIG. 1.

In step S01 of FIG. 3, each of the cores 10 to 13 determines whether there is no function registered in the lock-free function queue LFQ1 (the lock-free function queue LFQ1 is empty). If the lock-free function queue LFQ1 is empty, the processing ends. If the lock-free function queue LFQ1 is not empty, the flow of processing proceeds to step S02 to acquire the head entry indicated by the HEAD value from the lock-free function queue LFQ1.

Next, in step S03, each of the cores 10 to 13 determines whether the function acquired from the lock-free function queue LFQ1 is the checker function 22, and if it is the checker function 22, the flow of processing proceeds to step S06 to execute processing 100 of the checker function 22. If it is not the checker function 22, the flow of processing proceeds to step S04, where each of the cores 10 to 13 determines whether the function acquired from the lock-free function queue LFQ1 is the limiter function 23. If it is the limiter function 23, the flow of processing proceeds to step S09 to end the processing of the limiter function 23, and the flow of processing returns to step S01. If it is not the limiter function 23, each of the cores 10 to 13 proceeds to step S05, executes the function acquired in step S02, and then returns to step S01.

In the processing 100 of the checker function 22, each of the cores 10 to 13 reads in step S06 the head entry indicated by the HEAD value from the lock-free function queue LFQ1. Next, in step S07, each of the cores 10 to 13 determines whether the function acquired in step S06 is either the checker function 22 or the limiter function 23 having the same process barrier ID 24 as that of the checker function 22 in step S03. If it is either the checker function 22 or the limiter function 23, the flow of processing returns to step S06 to repeat reading of the head entry indicated by the HEAD value of the lock-free function queue LFQ1. If it is neither the checker function 22 nor the limiter function 23, the flow of processing proceeds to step S08 to end the processing of the checker function 22, and the flow of processing returns to step S01.

Due to this, the function group the data of which is separated and thus not in conflict is concurrently executed by the plurality of cores 10 to 13, and the function group the data of which is not separated is temporally separated by the process barrier 20 and executed sequentially. Furthermore, the program state after execution by each of the cores 10 to 13 by this concurrent execution control matches the program state after sequential execution of the function group registered in the lock-free function queue LFQ1. For this reason, the reproducibility and predictability of the post-execution program state can be guaranteed even when concurrent execution is performed using the plurality of cores 10 to 13.

Furthermore, each of the cores 10 to 13 can process the function registered in the lock-free function queue LFQ1 without generating dead time due to inter-core synchronization. For this reason, even if a calculation processing load such as an interrupt occurs irregularly in each of the cores 10 to 13, as long as it is finite, the worst execution time required for processing of the function group can be guaranteed. The inter-core communication mechanism is not required, and the problem of scalability of the inter-core communication mechanism with respect to the number N of cores involved in barrier synchronization does not occur.

Figure 4:
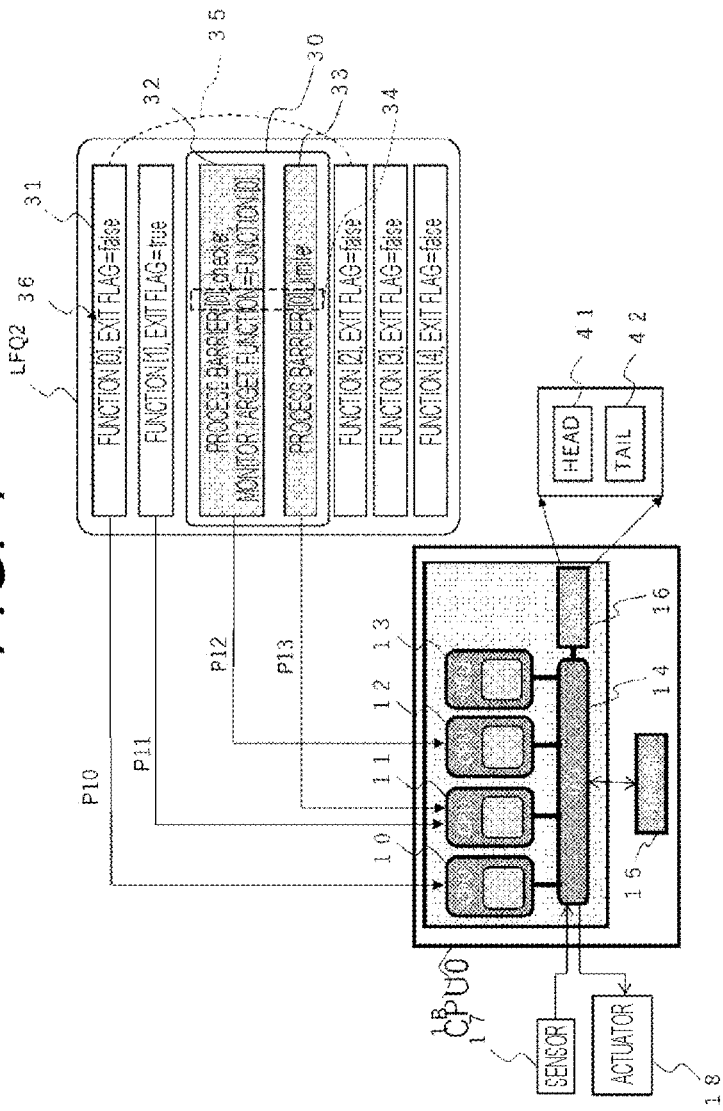
FIG. 4 is a block diagram illustrating a configuration of a vehicle control device to which a program execution control device according to a second embodiment is applied.

FIG. 4 is a block diagram illustrating the configuration of the vehicle control device to which the program execution control device according to the second embodiment is applied.

In FIG. 4, a computer 1B is provided with the plurality of cores 10 to 13, the input/output interface 14, the DRAM 15, and the cache 16. The computer 1B is connected to the sensor 17 and the actuator 18 via the input/output interface 14. The DRAM 15 holds a lock-free function queue LFQ2. In the lock-free function queue LFQ2, a plurality of functions that can be executed concurrently by the computer 1A are registered in sequence. FIG. 4 illustrates an example in which the functions [0] to [4] are registered. An exit flag 36 indicating the end of processing of the function is added to each function. Each function sets its own exit flag to true when the processing of the own function ends, and sets its own exit flag to false when the processing of the own function has not ended. The exit flag 36 of the function whose processing has not ended may be initialized to false in advance, and the exit flag of the own function may be set to true when the processing of the own function ends.

In the lock-free function queue LFQ2, a process barrier 30 is inserted between functions in data conflict. The process barrier 30 is arranged immediately before the subsequent function of the prior and subsequent functions in data conflict. For example, assuming that the functions [0] and [2] cause data conflict 35, the process barrier 30 is inserted immediately before the function [2].

The process barrier 30 causes execution of the subsequent function to wait at a position of the process barrier 30 until execution of the prior function of the prior and subsequent functions in data conflict is completed. At this time, the process barrier 30 monitors whether the execution of the prior function of the prior and subsequent functions in data conflict has been completed. Then, the process barrier 30 allows allocation of the cores 10 to 13 which are to execute the subsequent function upon completion of execution of the prior function of the prior and subsequent functions in data conflict.

The process barrier 30 includes a checker function 32 for confirming processing completion of a designated function, and a limiter function 33 for causing execution of a function subsequent to the process barrier 30 to wait. One checker function 32 and one limiter function 33 are provided in the process barrier 30, and the checker function 32 and the limiter function 33 are paired. The limiter function 33 is arranged immediately after the checker function 32. A list of functions whose exit flag 36 is a target to be monitored (hereinafter referred to as a monitor target function) is added to the checker function 32. If a plurality of monitor target functions exist, all those monitor target functions are registered in the checker function 32. The monitor target function can be registered in the checker function 32 in advance by the programmer. FIG. 4 presents an example in which a process barrier [0]_checker and a monitor target function=function [0] are inserted as the checker function 32, and the process barrier [0]_limiter is inserted as the limiter function 33.

Upon confirming the processing completion of the designated functions, the checker function 32 deletes the limiter function 33 paired with the checker function 32 from the lock-free function queue LFQ2. Each of the cores 10 to 13 interrupts acquisition and execution of the function during the processing of the process barrier 30, and resumes the processing of acquiring and executing the function from the lock-free function queue LFQ2 after deletion of the limiter function 33.

Here, the core for monitoring the completion of execution of the designated function is allocated separately from the core for executing the designated function. Furthermore, in the cores other than the those executing the designated function or monitoring the completion of the execution of the designated function, the execution of the function subsequent to the process barrier 30 is blocked by the process barrier [0]_limiter until the execution of the designated function is completed.

The introduction of the process barrier 30 eliminates the need to fix the number of cores involved in the processing of the lock-free function queue LFQ2. Therefore, the number of cores allocated to the processing of the lock-free function queue LFQ2 can be dynamically changed in accordance with the actual processing load of each core, thereby allowing the calculation load to be leveled and the worst response time to be guaranteed.

In addition, in the process barrier 20 of FIG. 1, the execution of the function subsequent to the process barrier 20 cannot be performed unless the execution of all the functions prior to the process barrier 20 is completed. On the other hand, in the process barrier 30 of FIG. 4, even if the execution of any function prior to the process barrier 30 is not completed, the function subsequent to the process barrier 30 can be executed when the execution of the monitor target function is completed, thereby allowing the waiting time for the execution of the function subsequent to the process barrier 30 to be reduced.

Figure 5:
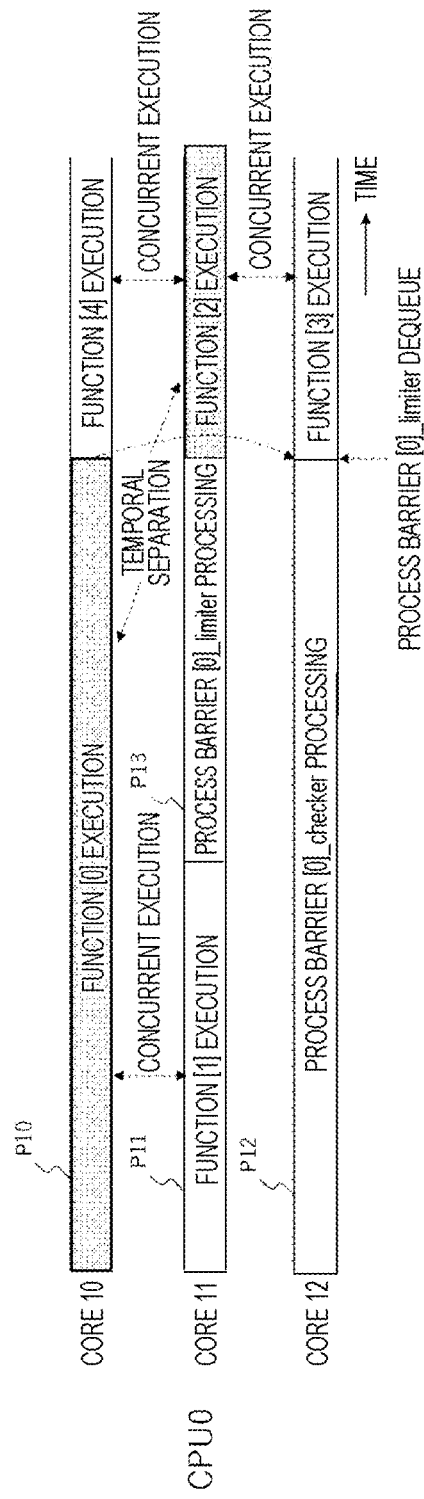
FIG. 5 is a timing chart illustrating an operation state of the program execution control device of FIG. 4.

FIG. 5 is a timing chart illustrating the operation state of the program execution control device of FIG. 4. FIGS. 4 and 5 present examples of a case in which, in the function [0] and the function [1] to be concurrently executed, the function [1], which is not a monitor target function, completes earlier than the function [0], which is a monitor target function.

FIG. 5 assumes that the cores capable of concurrent execution are the cores 10 to 12 of FIG. 4. The HEAD 41 is assumed to indicate the function [0] as the head entry of the lock-free function queue LFQ2. Then, assuming that the cores 10 to 12 execute the CAS instruction and the core 10 succeeds in execution of the CAS instruction, the core 10 acquires the function [0] indicated by the HEAD 41, executes the function [0], and advances the HEAD 41 to the next registration entry (P10). At this time, the HEAD 41 indicates the function [1] as the head entry of the lock-free function queue LFQ2.

Next, assuming that the cores 11 and 12 having failed to execute the CAS instruction last time execute the CAS instruction again and the core 11 has succeeded in execution of the CAS instruction, the core 11 acquires the function [1] indicated by the HEAD 41, executes the function [1], and advances the HEAD 41 to the next registration entry (P11). At this time, the HEAD 41 indicates the process barrier [0]_checker as the head entry of the lock-free function queue LFQ2. The function [0] and the function [1] are executed concurrently by the cores 10 and 11.

Next, assuming that the core 12 having failed to execute the CAS instruction last time executes the CAS instruction again and the core 12 has succeeded in execution of the CAS instruction, the core 12 acquires the process barrier [0]_checker indicated by the HEAD 41, executes the processing of the process barrier [0]_checker, and advances the HEAD 41 to the next registration entry (P12). At this time, the HEAD 41 indicates the process barrier [0]_limiter as the head entry of the lock-free function queue LFQ2.

Next, assuming that the execution of the function [1] has been completed, the core 11 executes the CAS instruction. When the execution of the CAS instruction is succeeded, the core 11 acquires the process barrier [0]_limiter indicated by the HEAD 41, and executes the processing of the process barrier [0]_limiter (P13). At this time, the core 11 leaves the HEAD value as it is without advancing the HEAD 41 to the next registration entry. For this reason, the HEAD 41 remains indicating the process barrier [0]_limiter as the head entry of the lock-free function queue LFQ2. In the processing of the process barrier [0]_limiter, the core 11 reads the head entry of the lock-free function queue LFQ2, and, if the head entry is the process barrier [0]_limiter, repeats reading of the head entry of the lock-free function queue LFQ2.

The core 12 executing the processing of the process barrier [0]_checker monitors the exit flag 36 of the function [0] that is a monitor target function, and, if the exit flag 36 of the function [0] is false, continues monitoring of the exit flag 36 of the function [0].

On the other hand, upon completion of the execution of the function [0], the core 10 sets the exit flag 36 of the function [0] to true. When the exit flag 36 of the function [0] becomes true, the core 12 dequeues the process barrier [0]_limiter and ends the processing of the process barrier [0]_checker. At this time, the core 12 advances the HEAD 41 to the next registration entry. Therefore, the HEAD 41 indicates the function [2] as the head entry of the lock-free function queue LFQ2.

When the HEAD 41 indicates the function [2] as the head entry of the lock-free function queue LFQ2, the head entry of the lock-free function queue LFQ2 is no longer the process barrier [0]_limiter. At this time, when the core 11 executing the processing of the process barrier [0]_limiter reads the head entry of the lock-free function queue LFQ2, which is not the process barrier [0]_limiter, the core 11 can escape from the processing of the process barrier [0]_limiter and pass through the process barrier 30. Furthermore, the core 12 dequeues the process barrier [0]_limiter, thereby allowing the cores 10 and 12 to pass through the process barrier 30.

Upon passing through the process barrier 30, the cores 10 to 12 execute the CAS instruction. Then, the cores 10 to 12 acquire the functions [2] to [4] in accordance with the order in which the CAS instruction has succeeded, and concurrently execute the functions [2] to [4].

Figure 6:
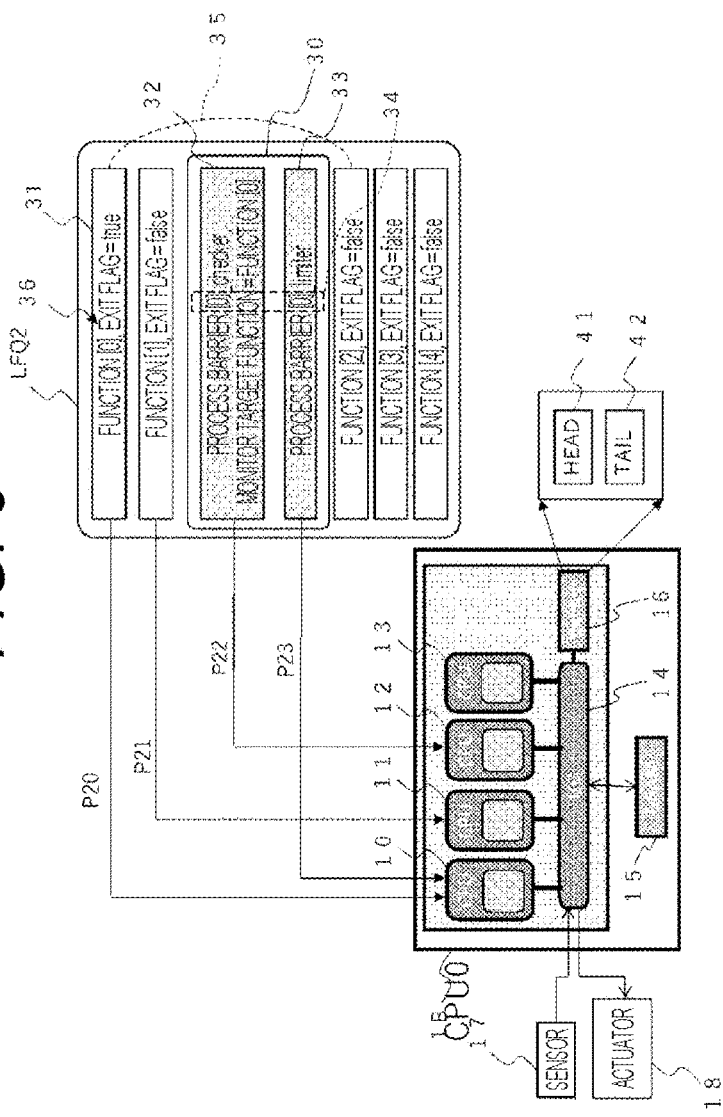
FIG. 6 is a block diagram illustrating another operation state of the program execution control device according to the second embodiment.
Figure 7:
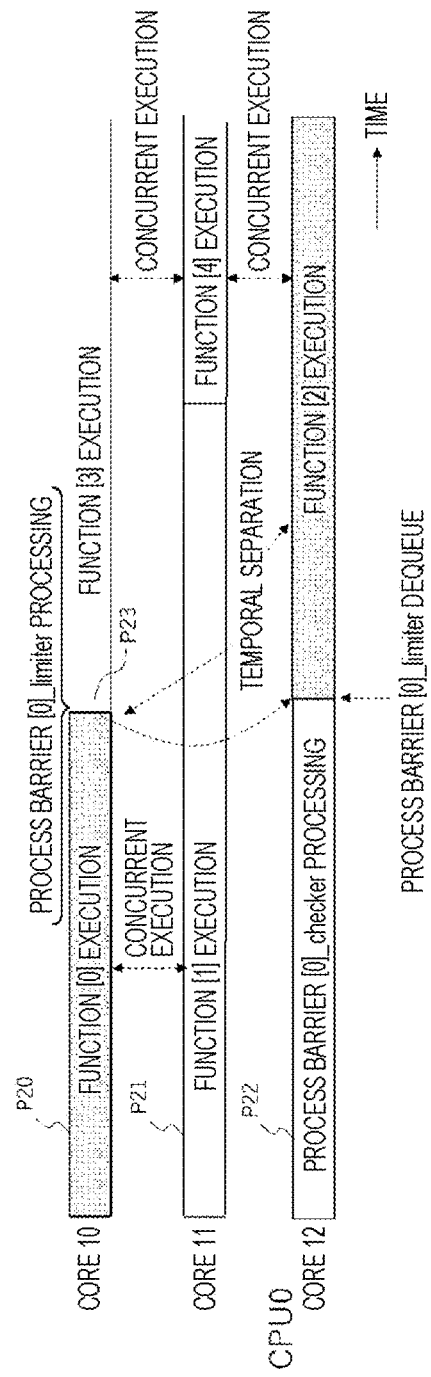
FIG. 7 is a timing chart illustrating an operation state of the program execution control device of FIG. 6.

FIG. 6 is a block diagram illustrating another operation state of the program execution control device according to the second embodiment, and FIG. 7 is a timing chart illustrating an operation state of the program execution control device of FIG. 6. FIGS. 6 and 7 present examples of a case in which, in the function [0] and the function [1] to be concurrently executed, the function [0], which is a monitor target function, completes earlier than the function [1], which is not a monitor target function.

FIGS. 6 and 7 assume that the cores capable of concurrent execution are the cores 10 to 12 of FIG. 4. The HEAD 41 is assumed to indicate the function [0] as the head entry of the lock-free function queue LFQ2. Then, assuming that the cores 10 to 12 execute the CAS instruction and the core 10 succeeds in execution of the CAS instruction, the core 10 acquires the function [0] indicated by the HEAD 41, executes the function [0], and advances the HEAD 41 to the next registration entry (P20).

At this time, the HEAD 41 indicates the function [1] as the head entry of the lock-free function queue LFQ2.

Next, assuming that the cores 11 and 12 having failed to execute the CAS instruction last time execute the CAS instruction again and the core 11 has succeeded in execution of the CAS instruction, the core 11 acquires the function [1] indicated by the HEAD 41, executes the function [1], and advances the HEAD 41 to the next registration entry (P21). At this time, the HEAD 41 indicates the process barrier [0]_checker as the head entry of the lock-free function queue LFQ2. The function [0] and the function [1] are executed concurrently by the cores 10 and 11.

Next, assuming that the core 12 having failed to execute the CAS instruction last time executes the CAS instruction again and the core 12 has succeeded in execution of the CAS instruction, the core 12 acquires the process barrier [0]_checker indicated by the HEAD 41, executes the processing of the process barrier [0]_checker, and advances the HEAD 41 to the next registration entry (P22). At this time, the HEAD 41 indicates the process barrier [0]_limiter as the head entry of the lock-free function queue LFQ2.

Next, assuming that the execution of the function [0] has been completed, the core 10 sets the exit flag 36 of the function [0] to true, and executes the CAS instruction. When the execution of the CAS instruction is succeeded, the core 10 acquires the process barrier [0]_limiter indicated by the HEAD 41, and executes the processing of the process barrier [0]_limiter (P23). At this time, the core 10 leaves the HEAD value as it is without advancing the HEAD 41 to the next registration entry. For this reason, the HEAD 41 remains indicating the process barrier [0]_limiter as the head entry of the lock-free function queue LFQ2. In the processing of the process barrier [0]_limiter, the core 10 reads the head entry of the lock-free function queue LFQ2, and, if the head entry is the process barrier [0]_limiter, repeats reading of the head entry of the lock-free function queue LFQ2.

The core 12 executing the processing of the process barrier [0]_checker monitors the exit flag 36 of the function [0] that is a monitor target function, and, if the exit flag 36 of the function [0] is false, continues monitoring of the exit flag 36 of the function [0].

On the other hand, when the exit flag 36 of the function [0] becomes true, the core 12 dequeues the process barrier [0]_limiter and ends the processing of the process barrier [0]_checker. At this time, the core 12 advances the HEAD 41 to the next registration entry. Therefore, the HEAD 41 indicates the function [2] as the head entry of the lock-free function queue LFQ2.

When the HEAD 41 indicates the function [2] as the head entry of the lock-free function queue LFQ2, the head entry of the lock-free function queue LFQ2 is no longer the process barrier [0]_limiter. At this time, when the core 10 executing the processing of the process barrier [0]_limiter reads the head entry of the lock-free function queue LFQ2, which is not the process barrier [0]_limiter, the core 10 can escape from the processing of the process barrier [0]_limiter and pass through the process barrier 30. Furthermore, the core 12 dequeues the process barrier [0]_limiter, thereby allowing the cores 11 and 12 to pass through the process barrier 30.

Upon passing through the process barrier 30, the cores 10 and 12 execute the CAS instruction. Then, the cores 10 and 12 acquire the functions [2] and [3] in accordance with the order in which the CAS instruction has succeeded, and concurrently execute the functions [2] and [3]. At this time, each of the cores 10 and 12 advances the registration entry of the HEAD 41 forwards. Therefore, the HEAD 41 indicates the function [4] as the head entry of the lock-free function queue LFQ2.

The core 11 continues the execution of the function [1] while the cores 10 and 12 are executing the function [2] and the function [3]. Then, upon completion of the execution of the function [1], the core 11 executes the CAS instruction. When the core 10 succeeds in the execution of the CAS instruction, the core 11 acquires the function [4] indicated by the HEAD 41 and executes the function [4]. At the time when the core 11 completes the execution of the function [1], the process barrier [0]_limiter has been dequeued. For this reason, the core 11 can execute the function [4] following the execution of the function [1] without waiting time due to the process barrier 30.

Here, in the first embodiment, even if the execution of the function [0] by the core 10 is completed, the process barrier 20 cannot be passed through unless the execution of the function [1] by the core 11 is completed. Therefore, even if the execution of the function [0] by the core 10 is completed, the function [2] and the function [3] cannot be executed unless the execution of the function [1] by the core 11 is completed.

In the second embodiment, on the other hand, when the execution of the function [0] by the core 10 is completed, the process barrier [0]_limiter is dequeued by the core 12. Therefore, when the execution of the function [0] by the core 10 is completed, the function [2] and the function [3] can be executed even if the execution of the function [1] by the core 11 is not completed. Therefore, in the second embodiment, compared with the first embodiment, it is possible to reduce the waiting time until the execution of the function [2] and the function [3] is started.

Even in a case where the core executing the function is interrupted and completion of the execution of the function is delayed, the other cores can continue acquiring and executing the function. Therefore, even when the core executing the function interrupted, the load can be distributed to other cores, and the response time for the interrupt processing from the external device can be suppressed and the load can be leveled.

In FIG. 7, after the core 10 completes the execution of the function [0] and sets the exit flag 36 of the function [0] to true, if the core 12 dequeues the process barrier [0]_limiter before the core 10 succeeds in the execution of the CAS instruction, the core 10 skips the processing of the process barrier [0]_limiter (P23) and can execute the function [3].

Figure 8:
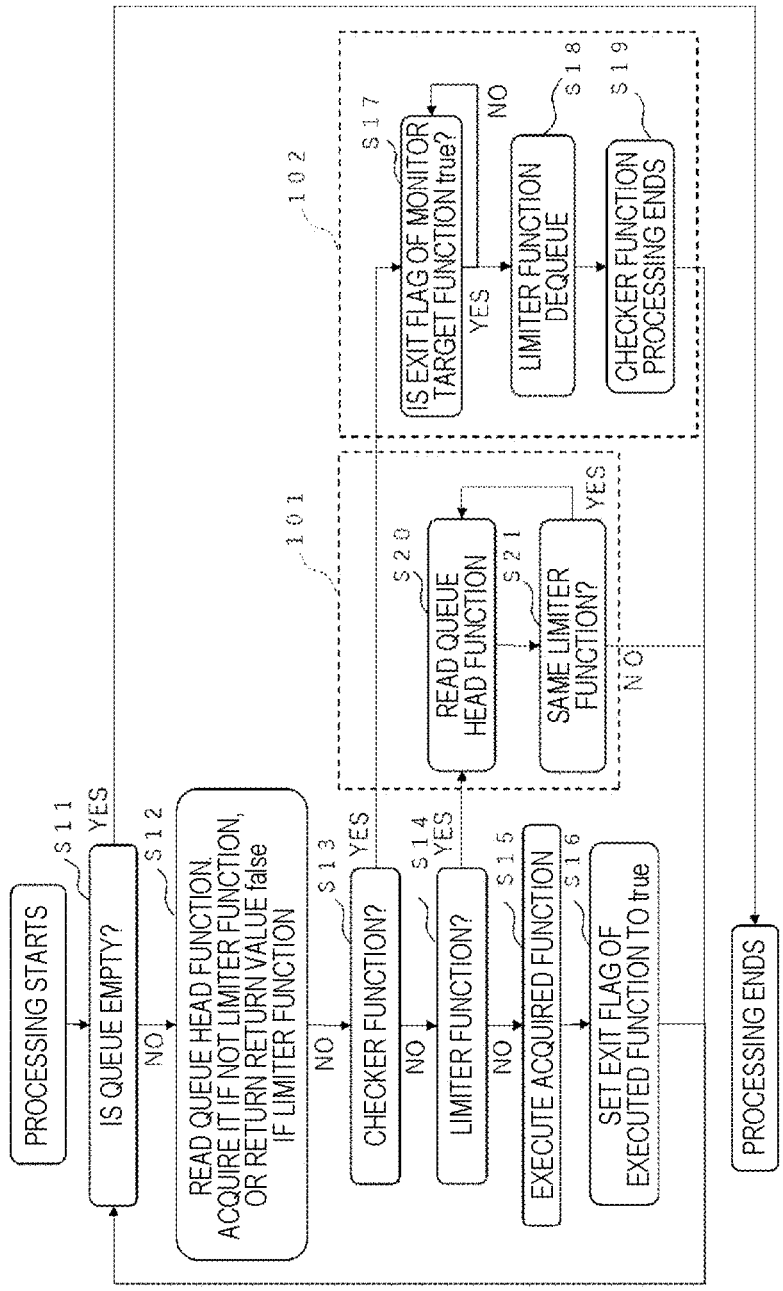
FIG. 8 is a flowchart illustrating a function execution method of the program execution control device of FIG. 4.

FIG. 8 is a flowchart illustrating the function execution method of the program execution control device of FIG. 4.

In step S11 of FIG. 8, each of the cores 10 to 13 determines whether the lock-free function queue LFQ2 is empty. If the lock-free function queue LFQ2 is empty, the processing ends. If the lock-free function queue LFQ2 is not empty, the flow of processing proceeds to S12 to read the head entry from the lock-free function queue LFQ2. If the entry having been read is not a limiter function, the head entry thereof is acquired, and if it is a limiter function, a return value false is returned. At this time, the HEAD value indicating the limiter function is maintained as it is, and the HEAD value is not advanced to the next registration entry.

Next, in step S13, each of the cores 10 to 13 determines whether the function acquired from the lock-free function queue LFQ2 is the checker function 32, and if it is the checker function 32, the flow of processing proceeds to step S17 to execute processing 102 of the checker function 22. If it is not the checker function 32, the flow of processing proceeds to step S14, where each of the cores 10 to 13 determines whether it is the limiter function 33. If it is the limiter function 33, the flow of processing proceeds to step S20 to execute processing 101 of the limiter function 33. If it is not the limiter function 33, the flow of processing proceeds to step S15, where each of the cores 10 to 13 executes the function acquired in step S12. Next, in step S16, the exit flag 36 of the function executed in step S15 is set to true, and the flow of processing returns to step S11.

In the processing 102 of the checker function 32, in step S17, an exit flag 37 of the monitor target function is read, and it is determined whether the exit flag 37 is true. If the exit flag 37 is not true, the processing of step S17 is repeated. When one core is executing the processing 102 of the checker function 32 and another core processing the monitor target function completes the execution of the monitor target function, the core having completed the execution of the monitor target function sets the exit flag 36 of the monitor target function to true.

When the exit flag 36 of the monitor target function is set to true by another core, the core executing the processing 102 of the checker function 32 determines in step S17 that the exit flag 37 is true, and the flow of processing proceeds to step S18. If a plurality of monitor target functions are registered in the checker function 32, the flow of processing proceeds to step S18 when the exit flags 37 of all the monitor target functions are true. In step S18, the core executing the processing 102 of the checker function 32 dequeues the limiter function 33, and the flow of processing proceeds to step S19. In step S19, the core executing the processing 102 of the checker function 32 ends the processing of the checker function 32, and the flow of processing returns to step S11.

In the processing 101 of the limiter function 33, in step S20, the head entry is read from the lock-free function queue LFQ2. Next, in step S21, the core executing the processing 101 of the limiter function 33 determines whether the function acquired in step S20 is the limiter function 33 having a same process barrier ID 34 as that of the limiter function 33 in step S14. For simplicity, the HEAD value of the lock-free function queue LFQ2 may be referenced and compared. In the case of the limiter function 33 having the same process barrier ID 34, the flow of processing returns to step S20 to repeat reading of the head entry of the lock-free function queue LFQ1.

When the core executing the processing 102 of the checker function 32 dequeues the limiter function 33 while a certain core is executing the processing 101 of the limiter function 33, the head entry of the lock-free function queue LFQ2 is no longer the limiter function 33 having the same process barrier ID 34. Therefore, in step S21, the core executing the processing 101 of the limiter function 33 determines that the function acquired in step S20 is not the limiter function 33 having the same process barrier ID 34, and the flow of processing returns to step S11.

Due to this, the limiter function 33 is dequeued at the time point when the function that is a target to be monitored by the checker function 32 is completed, and dead time associated with loop monitoring processing performed in step S20 is eliminated, and hence the processing can be speeded up. Furthermore, in the first embodiment, the checker function 22 registered in the process barrier 20 requires the designation of the number of cores to be allocated to the function processing, but in the second embodiment, the designation of the number of cores to be allocated to the function processing is no longer required. At any time point during processing of a function registered in the lock-free function queue LFQ2, a core which is to execute a function registered in the lock-free function queue LFQ2 may be added, or some cores may be reallocated to processing of another lock-free function queue.

Figure 9:
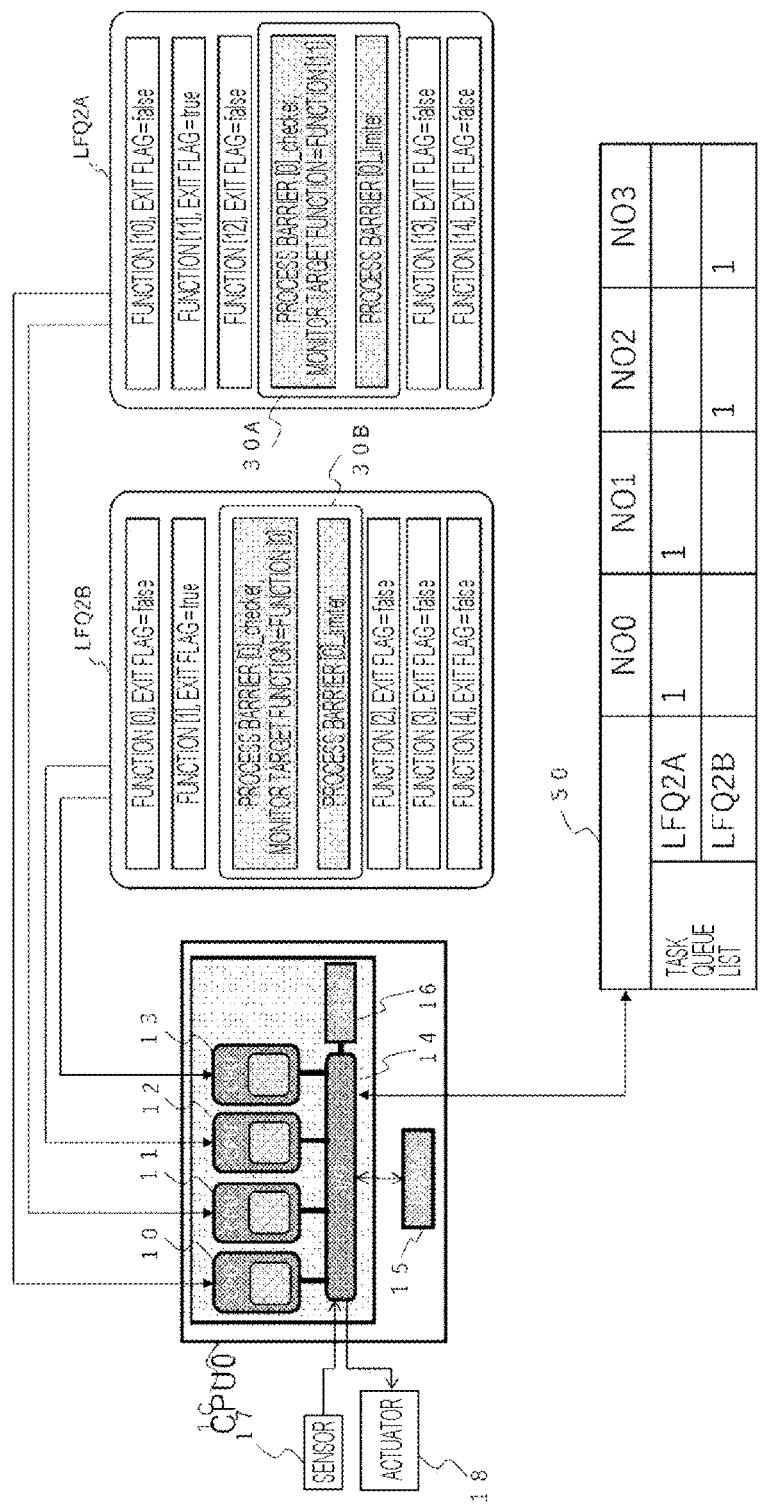
FIG. 9 is a block diagram illustrating a configuration of a vehicle control device to which a program execution control device according to a third embodiment is applied.

FIG. 9 is a block diagram illustrating the configuration of the vehicle control device to which the program execution control device according to the third embodiment is applied.

The program execution control device of FIG. 9 has a management table 50 added to the configuration of FIG. 4. The management table 50 manages the core number of the core allocated to execute the function registered in the lock-free function queue. A process barrier having the same configuration as that in FIG. 4 can be inserted into the lock-free function queue. At this time, the lock-free function queues can be classified on the basis of a task function and a dynamic characteristic such as an execution cycle.

For example, two lock-free function queues LFQ2A and LFQ2B are assumed. Functions [10] to [14] are registered in the lock-free function queue LFQ2A. The functions [11] and [13] cause data conflict, and a process barrier 30A is inserted immediately before the function [13]. The monitor target function that is a target to be monitored by the process barrier 30A is set to the function [11]. The functions [0] to [4] are registered in the lock-free function queue LFQ2B. The functions [0] and [2] cause data conflict, and a process barrier 30B is inserted immediately before the function [2]. The monitor target function that is a target to be monitored by the process barrier 30B is set to the function [0].

It is also assumed that the cores 10 to 13 are given core numbers NO0 to NO3, respectively. Here, assuming that the cores 10 and 11 are in charge of the lock-free function queue LFQ2A and the cores 12 and 13 are in charge of the lock-free function queue LFQ2B, the correspondence relationship between the lock-free function queue LFQ2A and the core numbers NO0 and NO1 and the correspondence relationship between the lock-free function queue LFQ2B and the core numbers NO2 and NO3 are registered in the management table 50.

Many-core control software is often used to integrate single-core applications. Therefore, rather than registering all the functions in one lock-free function queue, it is preferable to divide the functions into sequential execution processing units each constituting a subprogram library managed on a basis of execution cycle or processing characteristic. By constructing the thus divided lock-free function queues LFQ2A and LFQ2B and referring to the management table 50, it is possible to allocate cores which are to execute the functions registered in the lock-free function queues LFQ2A and LFQ2B. In a case of executing a periodic task started by a timer, the corresponding lock-free function queue LFQ2A or LFQ2B is selected at the time point of starting the timer, and the processing of FIG. 4 is executed.

By configuring the lock-free function queues LFQ2A and LFQ2B as illustrated in the second embodiment, the cores 10 to 13 to be allocated to the processing of the registration function can be dynamically controlled in accordance with the actual calculation load of each of the cores 10 to 13. By utilizing this point, even if different cores are allocated to the plurality of lock-free function queues LFQ2A and LFQ2B, the core allocated to the lock-free function queue whose processing has been ended earlier can be reallocated to the processing of the other lock-free function queue. Even if an indefinite amount of interrupt processing is concentrated on a specific core, this reallocation can level the calculation load of the entire core and guarantee the worst execution time.

REFERENCE SIGNS LIST 1A computer
10 to 13 core
14 input/output interface
15 DRAM
16 cache
17 sensor
18 actuator
LFQ1, LFQ2 lock-free function queue
20, 30 process barrier
21, 31 function
22, 32 checker function
23, 33 limiter function
24, 34 process barrier ID
36 exit flag

The invention claimed is:

1. A program execution control method, comprising:
a lock-free function queue in which a plurality of concurrently executable functions are registered in sequence, wherein
the lock-free function queue includes a process barrier inserted between functions in data conflict, and
of prior and subsequent functions in data conflict, the process barrier causes execution of the subsequent function to wait at a position of the process barrier until execution of the prior function is completed,
wherein, of the prior and subsequent functions in data conflict, the process barrier monitors whether execution of the prior function has been completed, and upon completion of the execution of the prior function, allows allocation of a core which is to execute the subsequent function,
wherein
the process barrier includes
a checker that confirms processing completion of a designated function, and
a limiter that causes execution of a function subsequent to the process barrier to wait,
upon confirming processing completion of the designated function, the checker deletes the limiter paired with the checker from the lock-free function queue, and
the core interrupts acquisition and execution of the function at a time of processing of the process barrier, and resumes processing of acquiring and executing the function from the lock-free function queue after deletion of the limiter.

2. The program execution control method according to claim 1, comprising:
a plurality of the lock-free function queues; and
a management table that manages a core number of a core allocated for executing a function registered in each of the lock-free function queues.

3. The program execution control method according to claim 1, wherein the core makes the lock-free function queue lock-free by using an atomic instruction when updating a variable indicating a head entry of the lock-free function queue.

4. A program execution control method, comprising:
a lock-free function queue in which a plurality of concurrently executable functions are registered in sequence, wherein
the lock-free function queue includes a process barrier inserted between functions in data conflict, and
of prior and subsequent functions in data conflict, the process barrier causes execution of the subsequent function to wait at a position of the process barrier until execution of the prior function is completed,
wherein, of the prior and subsequent functions in data conflict, the process barrier monitors whether execution of the prior function has been completed, and upon completion of the execution of the prior function, allows allocation of a core which is to execute the subsequent function,
the process barrier includes N−1 checkers and one limiter, where a number of cores capable of concurrently executing the functions is N (N is an integer equal to or greater than 2),
the checkers determine whether a head entry of the lock-free function queue is either the checker or the limiter, and repeats reading of the head entry if either, and ends processing if neither, and
the limiter is an empty function ending without performing any processing.

5. A vehicle control device, comprising:
a plurality of cores; and
a shared memory accessible from the cores, wherein
the shared memory holds a lock-free function queue including a process barrier inserted between functions in data conflict,
the process barrier includes
a checker configured to confirm processing completion of a designated function, and
a limiter configured to cause execution of a function subsequent to the process barrier to wait, and
the cores are configured to interrupt acquisition and execution of the function at a time of processing of the process barrier, and when the checker confirms processing completion of the designated function at a time of execution of the checker, the checker deletes the limiter paired with the checker from the lock-free function queue, and the cores resume processing of acquiring and executing the function from the lock-free function queue after deletion of the limiter.

6. The vehicle control device according to claim 5, comprising:
a plurality of the lock-free function queues; and
a table configured to manage core numbers of cores allocated for executing a function registered in each of the lock-free function queues.

7. The vehicle control device according to claim 6, wherein
the lock-free function queues are classified on a basis of a task function or a dynamic characteristic, and
cores that process the lock-free function queues are dynamically allocated.

8. The vehicle control device according to claim 6, wherein cores that process the lock-free function queues are dynamically reallocated in accordance with a processing state of the lock-free function queues.

* * * * *